R. J. BALZ.
LUBRICATING DEVICE FOR INTERNAL COMBUSTION ENGINES.
APPLICATION FILED FEB. 17, 1915.

1,283,622.

Patented Nov. 5, 1918.

WITNESSES:

INVENTOR
R. J. Balz
BY Howard P. Denison
ATTORNEY.

UNITED STATES PATENT OFFICE.

ROBERT J. BALZ, OF SYRACUSE, NEW YORK, ASSIGNOR OF ONE-HALF TO GERTRUDE C. MEYER, OF SYRACUSE, NEW YORK.

LUBRICATING DEVICE FOR INTERNAL-COMBUSTION ENGINES.

1,283,622. Specification of Letters Patent. Patented Nov. 5, 1918.

Original application filed April 9, 1914, Serial No. 830,610. Divided and this application filed February 17, 1915. Serial No. 8,963.

*To all whom it may concern:*

Be it known that I, ROBERT J. BALZ, a citizen of the United States, and resident of Syracuse, in the county of Onondaga, in the State of New York, have invented new and useful Improvements in Lubricating Devices for Internal-Combustion Engines, of which the following, taken in connection with the accompanying drawings, is a full, clear, and exact description.

This invention relates to certain improvements in lubricating devices for internal combustion engines of the class set forth in my pending application No. 830,610, of which this is a division.

The main object is to provide force feed lubricating means located within the closed crank case for distributing oil to the various bearings within or upon said crank case, and also to the cylinder and piston movable therein.

Another object is to provide a sight feed as a part of the lubricating system to enable the operator to determine at a glance whether or not oil is being fed to the various bearings communicating with said system.

Other objects and uses will be brought out in the following description.

In the drawings

The base of the crank case —2— is provided with an oil containing chamber —A— which is separate from the underlying gasolene chamber by a horizontal partition —a— and within this oil containing chamber and upon the partition —a— is mounted an oil pump —B— having a pair of revoluble pump gears —b— meshing with each other, one of which is driven from the cam shaft as —28— by suitable gears —c—.

Figure 1:
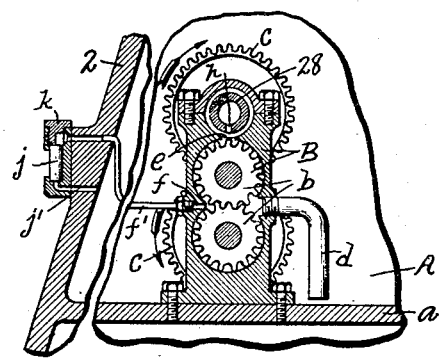
Figure 1 is a vertical sectional view of a portion of the crank case and oil chamber together with the force feed pump and adjacent portions of the lubricating system.
Figure 2:
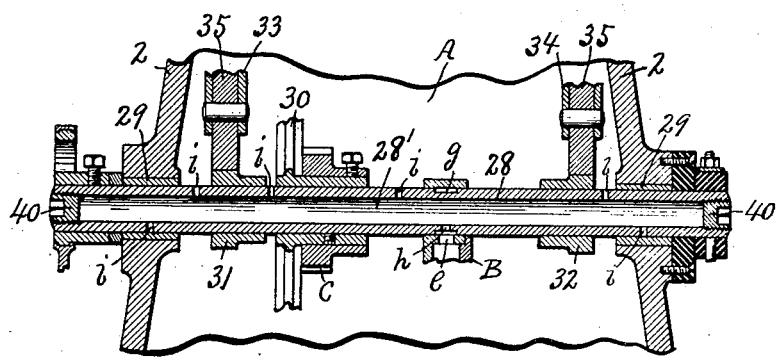
Fig. 2 is a vertical sectional view through the same crank case and hollow timer-shaft into which the oil is fed by the pump for distribution to the bearings of said shaft and also to the cam bearings mounted thereon.

The cam shaft —28— is journaled in suitable bearings —29— in opposite sides of the crank case —2— so as to extend horizontally across the intervening space between said sides and is adapted to be driven from the crank shaft (not shown) through the medium of suitable gears, one of which is partly shown at —30— in Fig. 2, these gears being timed to drive the cam shaft at one-half the speed of the crank shaft. This cam shaft has a pair of cams —31— and —32— rigid thereon for operating the inlet and exhaust valves (not shown) through the medium of rock arms —33— and —34— having rollers —35— which bear upon the peripheries of their respective cams —32—.

The pump —B— is provided with an inlet pipe —d— and outlet ports —e— and —f—, the outlet port —e— communicating with an annular space —g— in the upper portion of the pump case through which the cam shaft —28— passes, said shaft being provided with one or more radial openings —h— communicating with the annular space —g—, so that any oil which is forced through the outlet port —e— enters the entire chamber —28'— of the hollow shaft —28—.

This shaft —28— is also provided with radial outlet ports —i— arranged to distribute oil to the bearings —29— and also to the contacting surfaces between the cams —31— and —32— and their rollers —35—, the outlet opening —i— nearest the pump case being adapted to distribute oil to the wrist pin of the crank shaft (not shown).

It is evident from the foregoing description that under this force feed of the pump —B— the oil may be driven not only to the several bearings specified, but also to the bearings for the crank shaft in the sides of the case, because the entire oiling system is confined within said case, the ends of the shaft —28— being closed by plugs —40— to retain a quantity of oil therein as supplied by the pump.

The branch outlet port —f— is connected by a pipe —f'— to an external sight tube —j— having a return flow passage —j'— leading back into the interior of the oil reservoir —A—, said tube being supported within a case —k— on the adjacent side of crank case so that the attendant may see at a glance whether or not the oil is feeding through the pump and to the several bearings leading from the tubular cam shaft —28—.

The opening in the upper portion of the pump case through which the cam shaft —28— extends forms a journal bearing for the adjacent portion of said shaft at opposite sides of the annular passage —g—, which it is evident will be lubricated from the oil in said passage.

It will be observed that two of the oil passages —i— are located between the outer ends of the cams —31— and —32— and adjacent sides of the crank case —2— so that the centrifugal throw of the oil passing therethrough will cause it to be distributed to the peripheries of the cams, and also to the journal bearings for the rollers —35— and to other mechanisms which may be located within the oil chamber of the crank case.

The main feature of my invention, however, consists in locating a force feed pump within the inclosed oil chamber of the crank case and connecting it directly to the hollow cam shaft which extends from side to side of the crank case and permits a distribution of the oil to all the mechanisms which may be located within the crank case including the wrist pins of the crank shaft, the feed being partly by centrifugal force and partly under pressure of the pump which affords a more reliable lubricating system wholly concealed within the crank case of the engine, except that the sight tube is on the outside of the crank case where it is easily visible to the operator to determine the condition of the force feed system.

In operation, the oil which is placed in the chamber —A— of the crank case is drawn into the pump through the inlet tube —d— and is forced centrifugally by the pump gears —b— outwardly through the outlet —e— and into the interior of the tubular shaft —28— from which it is distributed partly by centrifugal force to the various mechanisms within the crank case, a part of the oil being carried out by the conduit —f'— to the sight tube —j— and is returned therefrom to the reservoir —A—.

What I claim is:

1. The combination with a crank case of an engine, a rotary double piston pump mounted vertically within said crank case, said pump provided with an inlet pipe and outlet ports, one of said ports communicating with an annular space formed in the upper portion of said pump, a cam shaft journaled horizontally within said crank case and extending through the annular space in the upper end of said pump, said shaft provided with a plurality of spaced radial outlet ports one of which communicates with the annular space at the upper end of said pump whereby oil may be fed to the interior of the crank shaft and may be expelled therefrom through its ports and means carried by the shaft for the operation of said pump upon the rotation of the shaft.

2. The combination with a crank case of an engine of a rotary double piston pump mounted vertically within said case, said pump provided with an inlet pipe and outlet ports, said pump also provided in its upper end with an annular space communicating with one of the outlet ports, a hollow shaft journaled horizontally within said crank case and extending through the annular space of the pump, said shaft provided with a plurality of spaced radial openings one of which communicates with the annular space of the pump whereby oil may be fed to the interior of the shaft and forced therefrom upon the bearings of the latter, and means carried by the shaft and pump whereby upon the rotation of the shaft the pump will be actuated.

In witness whereof I have hereunto set my hand this 8th day of February, 1915.

ROBERT J. BALZ.

Witnesses:
HERTHA GLAWATZ,
KURT J. GLAWATZ.

Copies of this patent may be obtained for five cents each, by addressing the "Commissioner of Patents. Washington, D. C."